July 24, 1928.  1,678,009
J. LEOPOLD
STRAIGHT LINE INDICATING MECHANISM
Filed Aug. 14, 1926
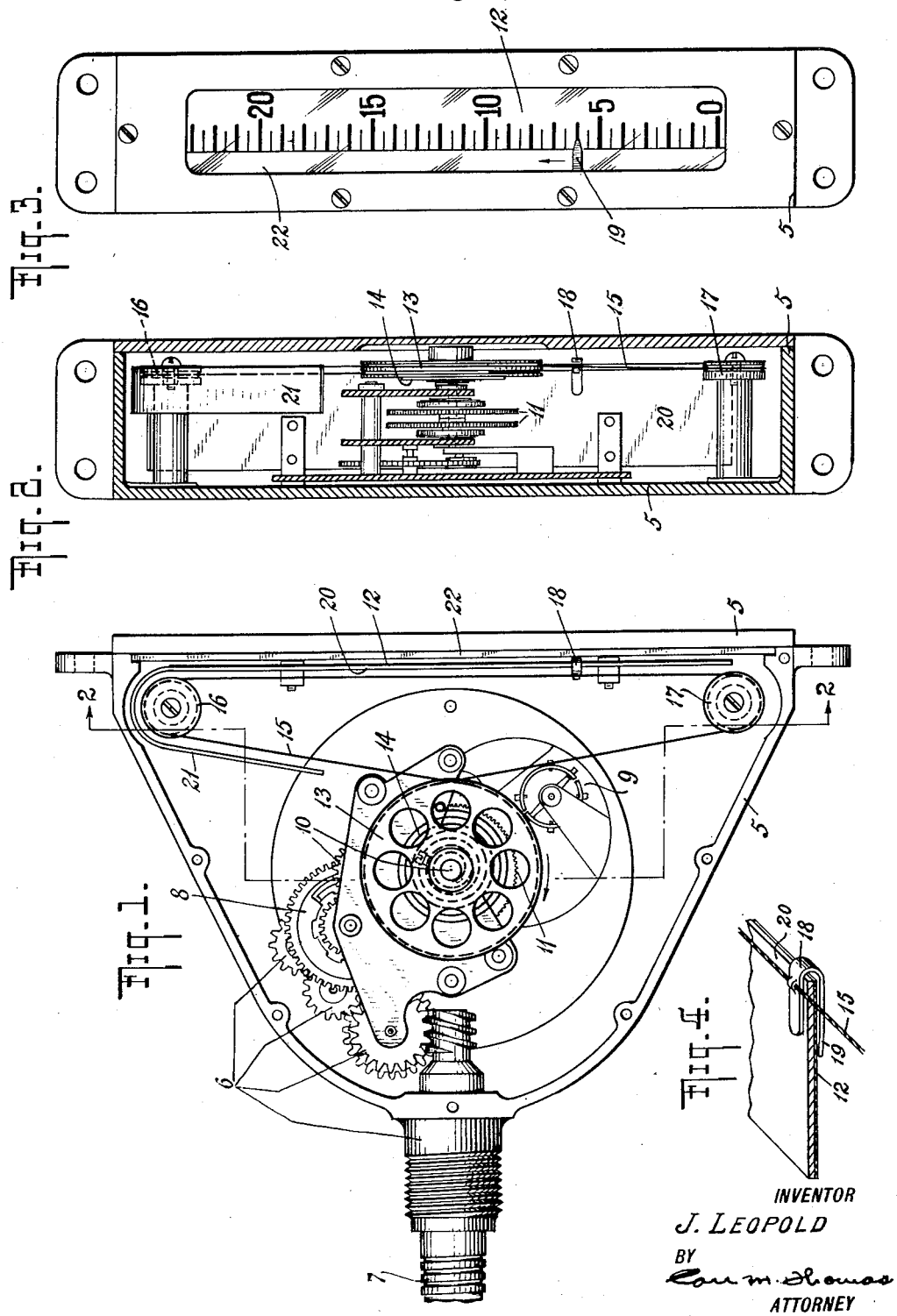
INVENTOR
J. LEOPOLD
BY
ATTORNEY

Patented July 24, 1928.

1,678,009

UNITED STATES PATENT OFFICE.

JOSEPH LEOPOLD, OF NEW YORK, N. Y., ASSIGNOR TO CONSOLIDATED INSTRUMENT COMPANY OF AMERICA, A CORPORATION OF NEW YORK.

STRAIGHT-LINE INDICATING MECHANISM.

Application filed August 14, 1926. Serial No. 129,205.

My invention relates to indicating mechanism, and more particularly to indicating mechanism suitable to instruments such as meters in which a rotary movement is measured and converted into a rectilinear movement to produce a straight-line indication of the measurement.

One object of my invention is to provide mechanism of improved simplicity and accuracy of operation for producing the straight-line indication often desirable in instruments such as tachometers. A further object is to prevent damage to the indicating mechanism in case of abnormal rotary movement.

My invention will be clearly understood when the following detailed description is read with reference to the accompanying drawing. The description is of a preferred embodiment of the invention as applied to a chronometric tachometer.

Figure 1 of the drawing is a side elevation of the tachometer with a side of the case removed; Fig. 2 is a view partly in section and taken approximately on the line 2—2 of Fig. 1; Fig. 3 is an end elevation, showing the chart or scale; and Fig. 4 is an enlarged detail in perspective, showing the relative positions of the index, the index guide strip, and the chart. Like numerals of reference in the several figures of the drawing designate corresponding parts.

The combined mechanism of the tachometer is enclosed in the case 5. The driving mechanism 6 takes the power from the flexible shaft 7 and transmits it to the "power plant" 8. The "power plant" furnishes the power for the driving of the watch mechanism 9, the counting mechanism 10 (including the gears 11), and synchronizing cams (not shown) which time the action of the counting mechanism and the action of which is timed by the watch mechanism. These parts and their operation are well known in the art, and, accordingly, are only partially shown or referred to and thus briefly discussed herein.

The counting mechanism counts the revolutions transmitted to it during periods of fixed length—seconds, for instance—and indicates the results on the chart or scale 12 through the responsive operation of my novel straight-line indicating mechanism.

A large pulley 13 is mounted concentrically with and in fixed relation to the gears 11 of the counting mechanism. A flat spiral spring 14, mounted between the gear 11 and the large pulley 13, serves to aid the return of the gears and the pulley to or toward their original positions upon a release of the counting mechanism. The large pulley 13 is circumferentially grooved as indicated in Fig. 1 and more clearly shown in Fig. 2. A flexible member 15, preferably a wire, having its ends secured in the groove of the large pulley 13, passes over this pulley and the two small pulleys 16 and 17 as shown in Figs. 1 and 2. Carried on this wire at a suitable point and fixed thereto is a U-shaped member 18, of which an arm 19 forms the index. The rectilinear movement of the member 18 is guided by the strip 20 mounted parallel to the length of wire stretched between the pulleys 16 and 17, and the chart 12 is placed on the outer surface of this strip, the index arm 19 extending over the chart. The chart has a length equal to the circumference of the large pulley 13 and is suitably graduated to scale—for instance, with reference to Fig. 3, one full division representing 100 revolutions per minute (R. P. M.). Thus the chart of Fig. 3 will register a maximum velocity of 2300 R. P. M. A glass 22 is mounted over the chart.

When the pulley 13 rotates with the gears 11 of the counting mechanism in the direction indicated by the arrow of Fig. 1, the wire 15 travels over the pulleys 16 and 17 and moves the index 19 rectilinearly over the chart in the direction of the arrow of Fig. 3.

The upper end 21 of the guide strip 20 is formed around the pulley 16 as shown and serves to prevent damage to the instrument in case an abnormally high speed is transmitted from the shaft 7 through the driving and counting mechanism to the large pulley 13 and the member 18 with the index 19 is carried beyond the upper end of the chart 21.

While my invention has, for the purpose of illustration, been disclosed in a specific form and as applied to a chronometric tachometer, it is to be understood that the scope of the invention is not limited thereby and that structural modifications and applications to other measuring and indicating and other recording instruments may be made within the scope of the appended claims.

I claim:

1. In a straight-line motion mechanism for indicating rotary movement, said mechanism including a plane chart, an index co-operable with said chart, and means for imparting rectilinear movement to said index in response to the movement to be indicated, a guide member for said index, said guide member being so formed as to control the normal travel of said index between the limits of said chart and the abnormal travel thereof beyond one of said limits.

2. In an instrument for indicating rotary movement, said instrument including a plane chart, an index member, and a guide member therefor parallel to said chart, a circumferentially grooved member rotatable in response to the movement to be indicated and means for imparting a rectilinear movement to said index member in response to the rotation of said rotatable member, said means comprising two auxiliary pulleys mounted one near each end of the chart and a flexible member secured to said index member and arranged substantially as described, said index member being so formed that it will pass freely over one of said auxiliary pulleys.

3. In an instrument for measuring rotary movement, a circumferentially grooved rotatable member, means for rotating said member in response to and proportionally to the movement to be measured, a retractile spring connected to said rotatable member for returning the same to its normal position upon a release of said rotating means, a plane chart, two pulleys mounted one near each end of said chart, a flexible member having its ends secured in the groove of said rotatable member and passing thereover and over said pulleys substantially as described, an index member secured to said flexible member, and a guide member co-operable with said flexible member for directing the movement of said index member.

4. In an instrument for measuring rotary movement, a circumferentially grooved rotatable member, means for rotating said member in response to and proportionally to the movement to be measured, a retractile spring connected to said rotatable member for returning the same to its normal position upon a release of said rotating means, a plane chart, two pulleys mounted one near each end of said chart, a flexible member having its ends secured in the groove of said rotatable member and passing thereover and over said pulleys substantially as described, and an index member secured to said flexible member and adapted to pass freely over one of said pulleys.

5. In association with a plane chart and an index rectilinearly movable thereover, a guide member parallel to the chart, said guide member being adapted to control the normal travel of the index between the limits of the chart and the abnormal travel thereof beyond one of said limits.

6. In association with a plane chart and an index rectilinearly movable thereover, a member for guiding the travel of the index, said member having a main portion parallel to the chart and an end portion bent back toward said main portion for preventing the rectilinear travel of the index beyond the corresponding end of the chart.

In testimony whereof, I have signed my name to this specification this 12th day of August, 1926.

JOSEPH LEOPOLD.